(12) United States Patent
Buer

(10) Patent No.: US 9,773,129 B2
(45) Date of Patent: Sep. 26, 2017

(54) ANTI-REPLAY PROTECTED FLASH

(71) Applicant: Avago Technologies General IP (Singapore) Ptd. Ltd., Singapore (SG)

(72) Inventor: Mark Buer, Payson, AZ (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 63 days.

(21) Appl. No.: 13/931,653

(22) Filed: Jun. 28, 2013

(65) Prior Publication Data
US 2015/0006789 A1 Jan. 1, 2015

(51) Int. Cl.
| | | |
|---|---|---|
| G06F 21/00 | (2013.01) | |
| G06F 21/79 | (2013.01) | |
| G06F 21/44 | (2013.01) | |

(52) U.S. Cl.
CPC .............. *G06F 21/79* (2013.01); *G06F 21/44* (2013.01); *G06F 2221/2107* (2013.01)

(58) Field of Classification Search
None
See application file for complete search history.

(56) References Cited

U.S. PATENT DOCUMENTS

| 7,775,427 | B2 | 8/2010 | Buer | |
|---|---|---|---|---|
| 8,332,653 | B2 | 12/2012 | Buer | |
| 8,498,418 | B2 * | 7/2013 | Meissner | G06F 21/602 380/277 |
| 2002/0059518 | A1 * | 5/2002 | Smeets et al. | 713/166 |
| 2004/0003246 | A1 * | 1/2004 | Hopkins | H04L 9/0625 713/168 |
| 2006/0059368 | A1 * | 3/2006 | Fayad | G06F 21/72 713/189 |
| 2007/0180538 | A1 * | 8/2007 | Kravitz et al. | 726/33 |
| 2007/0262143 | A1 * | 11/2007 | Yu et al. | 235/440 |
| 2012/0254629 | A1 * | 10/2012 | Zipperer et al. | 713/193 |

OTHER PUBLICATIONS

Smart Card and Security Basics, CardLogix 2009, 54 pages.

* cited by examiner

*Primary Examiner* — David X Yi
*Assistant Examiner* — Craig Goldschmidt
(74) *Attorney, Agent, or Firm* — Sterne, Kessler, Goldstein & Fox, P.L.L.C.

(57) ABSTRACT

Embodiments of the present disclosure describe a system and method for providing anti-replay protection. One embodiment describes a system comprising: a security device; and an anti-replay protected flash device comprising: a flash memory array; an authentication unit; and a secure memory, wherein the authentication unit and the secure memory are disposed in a security boundary.

20 Claims, 6 Drawing Sheets

ANTI-REPLAY PROTECTED FLASH

BACKGROUND

Field

Embodiments of the present disclosure generally relate to a system and method for providing anti-replay protection.

Background

Conventional flash devices, such as a memory card or a flash drive, are susceptible to replay attacks. In a replay attack, the attacker—which often has malicious intentions to gain unauthorized access to data or services—makes a copy of the contents of a flash device at a certain point in time. Later, the attacker replays the contents to trick a device providing data or services that the copied contents are legitimate. For example, the flash device contains an encrypted password. When the flash device couples to another device, e.g., a desktop computer, the encrypted password may be transmitted to the desktop computer to gain access to certain files or services.

In this example, the attacker copies the encrypted password from the flash device, and then simply replays the password to the desktop computer to gain unauthorized access to the files or services. As illustrated by this example, the attacker can gain unauthorized access without knowing the password on the flash device or the encryption key(s) used to (unsuccessfully) protect the password from unauthorized use. Using this technique, so long as the attacker can intercept and copy the contents of the flash device, the attacker does not even need to know the contents to launch an attack.

BRIEF DESCRIPTION OF THE DRAWINGS/FIGURES

DETAILED DESCRIPTION OF EXAMPLE EMBODIMENTS

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Figure 1:
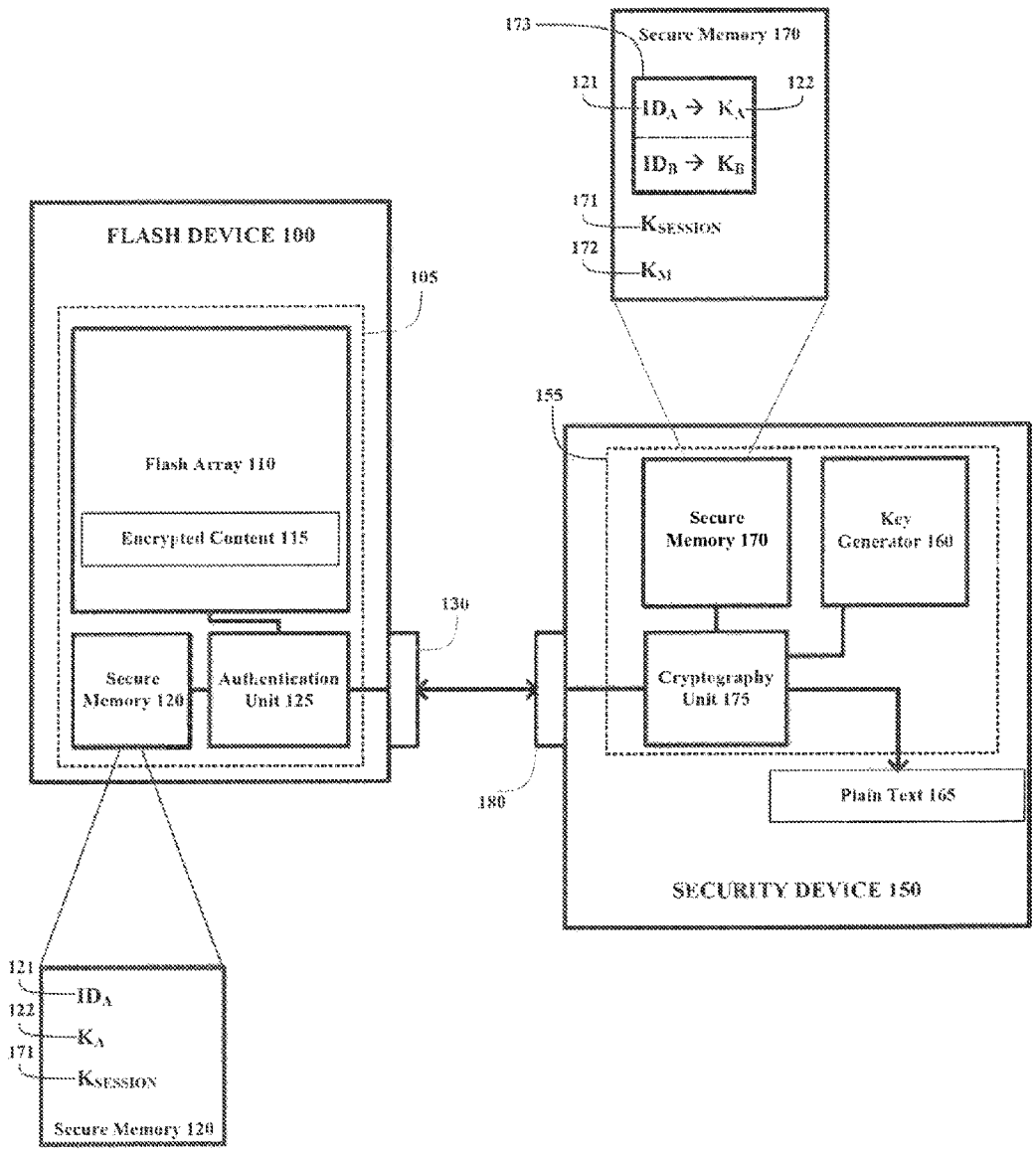
FIG. 1 illustrates an example system for providing anti-replay protection including an anti-replay protected flash device and a security device.

FIG. 1 illustrates an example system 10 for providing anti-replay protection. The system 10 includes as flash device 100 and a security device 150. Because certain features of the flash device 100, when used in combination with certain features of the security device 150, protect the system 10 of FIG. 1 from replay attacks, the flash device 100 may be described as an "anti-replay protected flash device." Here, the flash device 100 may be any device that includes a flash memory array including, but not limited to, a memory card, a flash drive, and the like.

The flash device 100 of FIG. 1 includes a flash array 110, a secure memory 120, an authentication unit 125, and a connectivity unit 130. The authentication unit 125 is coupled to each of the flash array 110, the secure memory 120, and the connectivity unit 130. The flash array 110, the authentication unit 125, the secure memory 120, and the connections between the authentication unit 125 and the flash array 110, and the authentication unit 125 and the secure memory 120 are disposed within a security boundary 105. As should be apparent to a person skilled in the art, other components—such as a processor, power supply, input/output device, and the like—may be included in the flash device 100, but are not necessary required to achieve some or all of the aspects of this disclosure.

The security boundary 105 may be established using hardware techniques, cryptographic techniques, or both hardware and cryptographic techniques. An example hardware technique for providing a security boundary includes placing components within a single integrated circuit. Additionally, one or more integrated circuits may be protected by a physical structure using tamper evident or tamper resistant techniques—which include, but are not limited to, epoxy encapsulation. An example encryption technique for establishing a security boundary includes encrypting sensitive information before it is shared outside the security boundary.

As its name suggests, the flash array 110 includes an array of flash memory. The flash array 110 may include any type of flash memory, such as NAND-type or NOR-type flash memory, and may store data—such as encrypted content 115. In some embodiments, the encrypted content 115 is encrypted in the security device 150, and transmitted from the security device 150 to the flash device 100 for storage in the flash array 110.

The flash device 100 of FIG. 1 includes the secure memory 120. The secure memory 120 may be considered "secure" because, for example, it may prohibit access from external devices, or its contents may be encrypted, or both.

In some embodiments, the authentication unit 125 is the only component permitted to access the contents of the secure memory 120.

The secure memory 120 of FIG. 1 may be any type of memory, and may be used to store a unique device identifier $ID_A$ 121 and a unique device key $K_A$ 122—where the unique device identifier $ID_A$ 121 represents an identifier that is unique to the flash device 100, and the unique device key $K_A$ 122 is a cryptographic key that is unique to the flash device 100. As described in more detail below, the unique device key $K_A$ 122 may be used by the authentication unit 125 to authenticate the flash device 100 to the security device 150.

The unique device identifier $ID_A$ 121 and unique device key $K_A$ 122 may be assigned to the flash device 100 and programmed or otherwise stored in the secure memory 120 at the time that the flash device 100 is manufactured or initially configured. In the flash device 100 of FIG. 1, the unique device key $K_A$ 122 is not shared outside of the security boundary 105 once it is stored in the secure memory 120. The secure memory 120 may also be used to store a session key $K_{SESSION}$ 171, which is described in more detail below.

The unique device key $K_A$ 122 may represent any secret shared between the flash device 100 and the security device 150 that the security device 150 may use to verify that the flash device 100 provides anti-replay protection. In some embodiments the unique device key $K_A$ 122 is a private cryptographic key that is shared between the flash device 100 and the security device 150—that is, each of the flash device 100 and security device 150 have a copy of the private key. These embodiments implement a symmetric cryptographic scheme to authenticate the flash device 100 to the security device 150.

Figure 2:
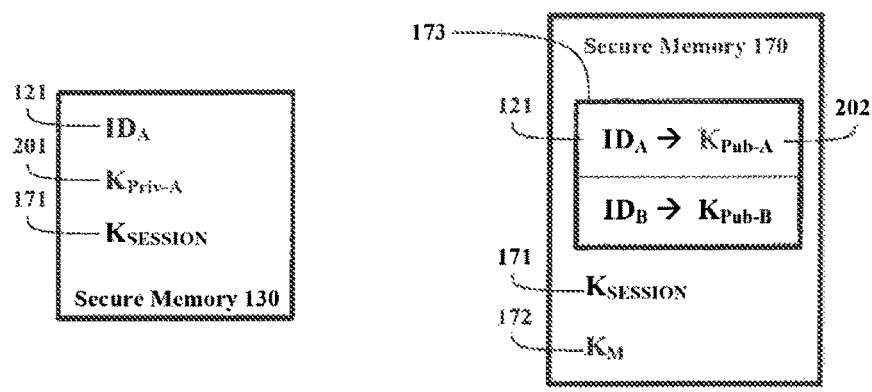
FIG. 2 illustrates example content of secure memory described in accordance with FIG. 1.

Other embodiments, such as the example embodiment depicted in FIG. 2, implement an asymmetric cryptographic scheme to authenticate the flash device 100. In these embodiments, the secret shared between the flash device 100 and the security device 150 is a public/private key pair. As illustrated in FIG. 2, the private unique device key $K_{Priv-A}$ 201 is disposed in the secure memory 120 of the flash device 100, and the public unique device key $K_{Pub-A}$ 202 is disposed in the secure memory 170 of the security device 150.

Returning to FIG. 1, the secure memory 120 may be implemented as non-volatile memory having read and write capabilities. In some embodiments, the secure memory 120 represents more than one physical memory device, and includes a non-volatile memory for storing data to be maintained despite a loss of power to the flash device 100 (such as the unique device identifier $ID_A$ 121 and the unique device key $K_A$ 122), and a volatile memory for storing data that is not necessary to maintain during a loss of power to the flash device 100 (such as the session key $K_{SESSION}$ 171). In these embodiments, the non-volatile memory may be read-only memory (ROM), and may be burned, fused, or otherwise programmed at the time of manufacture or during the initial configuration of the flash device 100 to include, at least, the unique device identifier $ID_A$ 121 and the unique device key $K_A$ 122.

The flash device 100 of FIG. 1 includes the authentication unit 125 for authenticating the flash device 100 to the security device 150. The authentication unit 125 may also authenticate messages exchanged between the flash device 100 and the security device 150. The authentication unit 125 may implement one or more security algorithms such as, but not limited to, one or more hash algorithms, one or more message authentication code (MAC) algorithms (e.g., MAC, HMAC, CMAC, AES-CMAC), one or more cryptography algorithms (e.g., symmetric cryptography, asymmetric cryptography), and the like. In some embodiments, such as an embodiment depicted by the example communication session of FIG. 4 (described below), the authentication unit 125 only implements a single algorithm—such as a single MAC algorithm—in order to minimize the amount of security logic and chip real-estate required by the authentication unit 125. The authentication unit 125 may be implemented in hardware, software, or a combination of hardware and software. All software described throughout this disclosure may be embodied as one or more instructions on a non-transitory computer readable medium.

The connectivity unit 130 may be any device for sending and receiving communications—wired or wireless—to and from the flash device 100. The connectivity unit 130 may include an interface (such as a physical interface) for coupling to an external device, and may be implemented in hardware or a combination of hardware and software. Examples of the connectivity unit 130—as well as the connectivity unit 180 of the security device 150—include, but are not limited to, a universal serial bus (USB) device, a near field communication (NFC) device, a Bluetooth communication device, a wireless local area network (WLAN) communication device, a cellular or other radio frequency (RF) communication device, a satellite communication device, an infrared communication device, and the like.

The security device 150 of FIG. 1 includes a key generator 160, a secure memory 170, a cryptography unit 175, and a connectivity unit 180. The cryptography unit 175 is coupled to each of the key generator 160, the secure memory 170, and the connectivity unit 180. The key generator 160, the secure memory 170, the cryptography unit 175, and the connections between the cryptography unit 175 and the key generator 160, and the cryptography unit 175 and the secure memory 170 are disposed within a security boundary 155. Like the security boundary 105 described above, the security boundary 155 may be established using hardware techniques, or cryptographic techniques, or both hardware and cryptographic techniques. Further, as should be apparent to a person skilled in the art, the security device 150 is not limited to the elements illustrated in FIG. 1, and may include any number of other elements—such as a processor, power supply, input device, output device, etc.

The security device 150 includes the key generator 160 to generate one or more cryptography keys, such as a session key $K_{SESSION}$ 171. In some embodiments—such as the example embodiment depicted in FIG. 1—the key generator 160 and the cryptography unit 175 are separate components. However, the key generator 160 may be included in the cryptography unit 175 in other embodiments. The key generator 160 and cryptography unit 175 may be implemented in hardware, software, or a combination of hardware and software.

As illustrated in FIG. 1, the session key $K_{SESSION}$ 171 generated by the key generator 160 may be stored in the secure memory 170 of the security device 150. Also, a copy of the session key $K_{SESSION}$ 171 may be sent to the flash device 100 for storage in the secure memory 120. The session key $K_{SESSION}$ 171 may be a private key. In some embodiments, a session key generated by the key generator 160 is valid until the occurrence of an expiration event.

In one example of an expiration event, a session key is valid until a fixed number of communications have been exchanged between the flash device 100 and the security device 150 during a communication session. In this example, the security device 150 may include a counter to track the number of communications exchanged during the communication session, and may invalidate the session key once the value of the counter meets or exceeds the fixed number. After the session key expires, the communication session may end, or the security device 150 may re-authenticate the flash device 100, generate a new session key, send the new session key to the flash device 100, and re-engage in communications using the new session key.

In a second example of an expiration event, a session key is valid until a certain amount of time since the session key's generation has elapsed—sometimes referred to as a "time-to-live." In this second example, the security device 150 may include a timer to track the amount of time having elapsed since the generation of the session key, and invalidates the session key after the time has elapsed. In a third example, a session key is valid until the flash device 100 is disconnected from the security device 150. In the third example, the security device 150 may invalidate the session key immediately upon detecting the disconnection, or may delay invalidating the session key for a fixed amount of time and attempt to reconnect to the flash device 100 (e.g., to accommodate unintentional disconnections).

The expiration events described above may be used alone or in combination. For example, a session key may be valid for the exchange of a fixed number of communications, for a certain amount of time, and until a disconnection is detected—i.e., the occurrence of any of these events may trigger expiration of the session key. The security device 150, e.g., the cryptography unit 175, may set or establish one or more expiration events associated with a session key. For example, an expiration event may be set when a session key is generated. Further, all sessions keys generated by a security device 150 may expire upon the same event, or each session key may be configured to expire upon different expiration events. As should be apparent to a person skilled in the art, the example expiration events described above do not constitute an exhaustive list, and other events may trigger expiration of a session key.

Turning back to FIG. 1, the security device 150 includes the secure memory 170, which may be any type of memory. Like the secure memory 120, the secure memory 170 may be considered "secure" because, for example, it may prohibit access from external devices, or its contents may be encrypted, or both. In some embodiments, the cryptography unit 175 is the only component permitted to access the contents of the secure memory 170.

In the example embodiment depicted in FIG. 1, the secure memory 170 may be used to store: the unique device identifier $ID_A$ 121 and the unique device key $K_A$ 122, both associated with the flash device 100; one or more session keys generated by the key generator 160, such as the session key $K_{SESSION}$ 171; and a master key $K_M$ 172 that may be used to encrypt data for storage in the flash array 110 (e.g., encrypted content 115), and decrypt data retrieved from the flash array 110 (e.g., plain text 165). In some embodiments, the security device 150 is the only device authorized to read and write data to and from the flash array 110. In some embodiments, the security device only writes data encrypted using the master key $K_M$ 172 to the flash array 110.

The unique device identifier $ID_A$ 121, the unique device key $K_A$ 122, and the master key $K_M$ 172 may be programmed or otherwise stored in the secure memory 170 at the time that the security device 150 is manufactured or initially configured. Further, as illustrated in FIG. 1, the unique device identifier $ID_A$ 121 and the unique device key $K_A$ 122 may be stored in a key table 173 of the secure memory 170 that associates the unique device identifier $ID_A$ 121 with the unique device key $K_A$ 122. The relationship between a unique device identifier and a unique device key may be referred to as a "unique device identifier/key pair," such as $ID_A \rightarrow K_A$ of FIG. 1. In some embodiments, the security device 150 is able to authenticate and communicate (protected from replay attacks) with plural flash devices, thus the key table 173 of FIG. 1 may store additional unique device identifier/key pairs—such as unique device identifier/key pair $ID_B \rightarrow K_B$. The key table 173 may be indexed and searched using unique device identifiers.

In some example embodiments, the secure memory 170 represents more than one physical memory device. In these embodiments, the secure memory 170 includes a non-volatile memory for storing data to be maintained in the security device 150 despite a loss of power to security device 150 (such as unique device identifier/key pairs, and the master key $K_M$ 172), and a volatile memory for storing data that is not necessary to maintain during a loss of power to security device 150 (such as the session key $K_{SESSION}$ 171). Further, the non-volatile memory may be read-only memory (ROM), and may be burned, fused, or otherwise programmed at the time of manufacture or during the initial configuration of the security device 150 to include, at least, the unique device identifier $ID_A$ 121, the unique device key $K_A$ 122, and the master key $K_M$ 172. In some embodiments, the master key $K_M$ 172 is a private key known only to the security device 150, and (once programmed into the secure memory 170) is not shared outside of the security boundary 155. Likewise, the unique device key $K_A$ 122 may be maintained within the security boundary 155 once programmed into the secure memory 170.

The security device 150 of FIG. 1 includes the cryptography unit 175 for authenticating the flash device 100 and messages exchanged with the flash device 100. The cryptography unit 175 may also encrypt content for storage in the flash array 110 using the master key $K_M$ 172 (such as the encrypted content 115), and decrypt content retrieved from the flash array 110 using the master key $K_M$ 172 (such as the plain text 165). The cryptography unit 175 may implement one or more security algorithms such as, but not limited to, one or more hash algorithms, one or more message authentication code (MAC) algorithms (e.g., MAC, HMAC, CMAC, AES-CMAC), one or more cryptography algorithms (e.g., symmetric cryptography, asymmetric cryptography), and the like. In some embodiments, the cryptography unit 175 is a cryptographic accelerator.

The connectivity unit 180 may be any device for sending and receiving communications—wired or wireless—to and from the security device 150. The connectivity unit 180 may include an interface (such as a physical interface) for coupling to an external device, and may be implemented in hardware or a combination of hardware and software. In some embodiments, the connectivity unit 130 couples to or "mates" with the connectivity unit 180 in a complementary manner. For example, the connectivity unit 130 may include a USB male connector, and the connectivity unit 180 may include a USB female connector. Other example implementations of the connectivity units 130 and 180 are described above.

Figure 3:
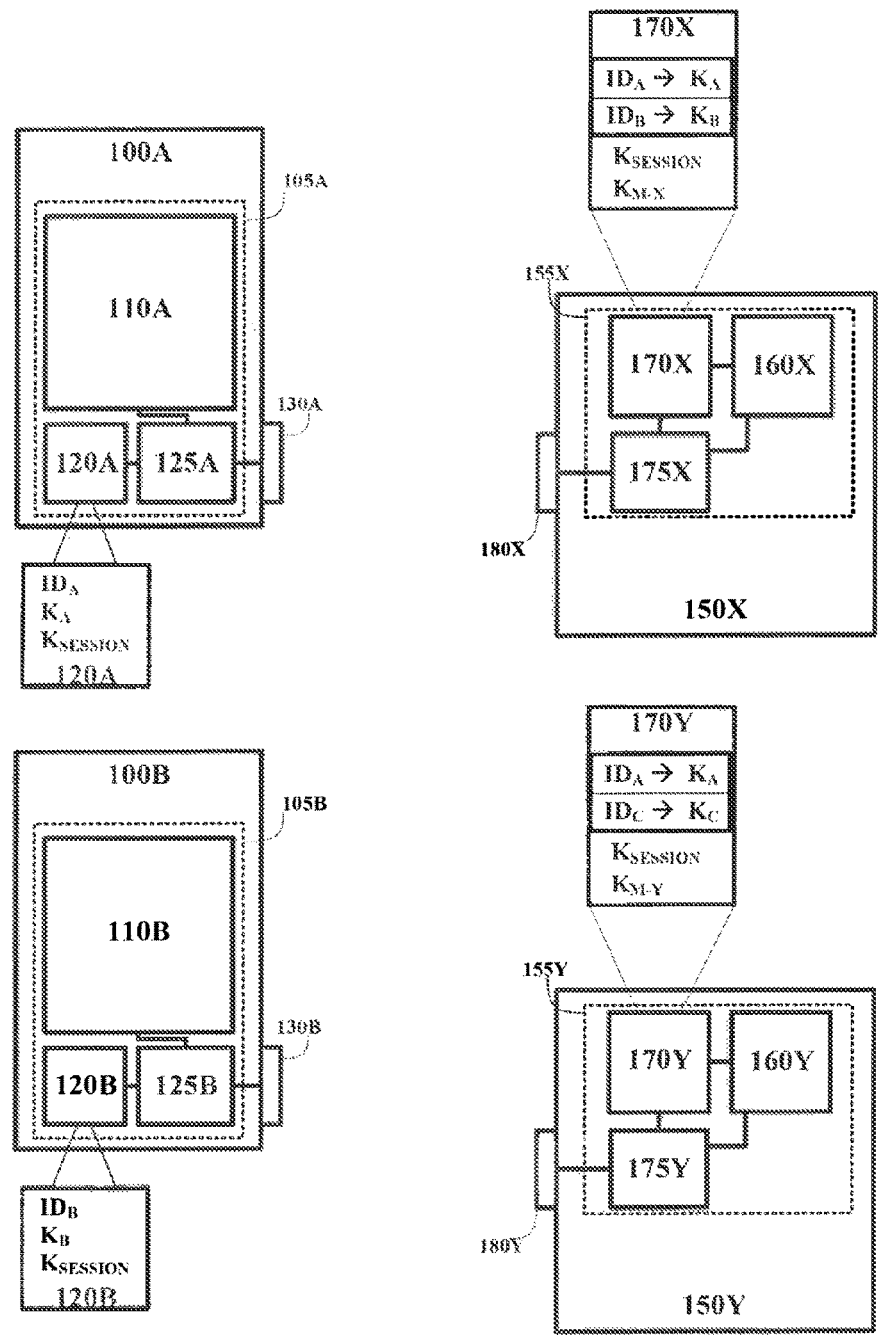
FIG. 3 illustrates an example system for providing anti-replay protection including plural anti-replay protected flash devices and plural security devices.

Some example systems within the scope of this disclosure are designed so that a single flash device is only able to be authenticated by and provide anti-replay protected communications to a single security device, i.e., in a one-to-one correspondence. However, this disclosure is not limited to such embodiments. Turning to FIG. 3, an example system 30 for anti-replay protection including plural anti-replay protected flash devices (such as flash devices 100A and 100B)

and plural security devices (such as security devices 150X and 150Y) is illustrated. In general and except as otherwise described below, the flash devices 100A and 100B (and their components) may be implemented as described in accordance with the flash device 100 of FIG. 1 (e.g., flash arrays 110A and 110B may be implemented as described in accordance with flash array 110 of FIG. 1), and the security devices 150X and 150Y (and their components) may be implemented as described in accordance with the security device 150 of FIG. 1.

FIG. 3 illustrates an example embodiment where a security device may be able to couple to and communicate with plural flash devices, and a flash device may be able to couple to and communicate with plural security devices. For example, the security device 150X stores the unique device identifier/key pairs $ID_A \rightarrow K_A$ and $ID_B \rightarrow K_B$ in the secure memory 170X. In this example, the security device 150X is able to authenticate each of the flash devices 100A and 100B using the techniques described throughout this disclosure, and thus is able to engage in communications with each of the flash devices 100A and 100B while protected from replay attacks. Note that the security device 150X may or may not be configured to communicate with the flash devices 100A and 100B at the same time; in some embodiments the security device 150X couples to and communicates with one flash device at a time.

On the other hand, the security device 150Y of FIG. 3 stores the unique device identifier/key pairs $ID_A \rightarrow K_A$ and $ID_C \rightarrow K_C$ (associated with a flash device 100C, which is not shown) in the secure memory 170Y. As such, the security device 150Y is able to authenticate the flash device 100A, but not the flash device 100B. Because, in this case, the security device 150Y cannot verify that the flash device 100B provides anti-replay protection, the security device 150Y may not engage in communications with the flash device 100B.

FIG. 3 illustrates that the flash device 100A may be authenticated by, and thus communicate with each of the security devices 150X and 150Y. Note that the flash device 100A may or may not be configured to communicate with the security devices 150X and 150Y at the same time; in some embodiments the flash device 100A couples to and communicates with one security device at a time.

Figure 4:
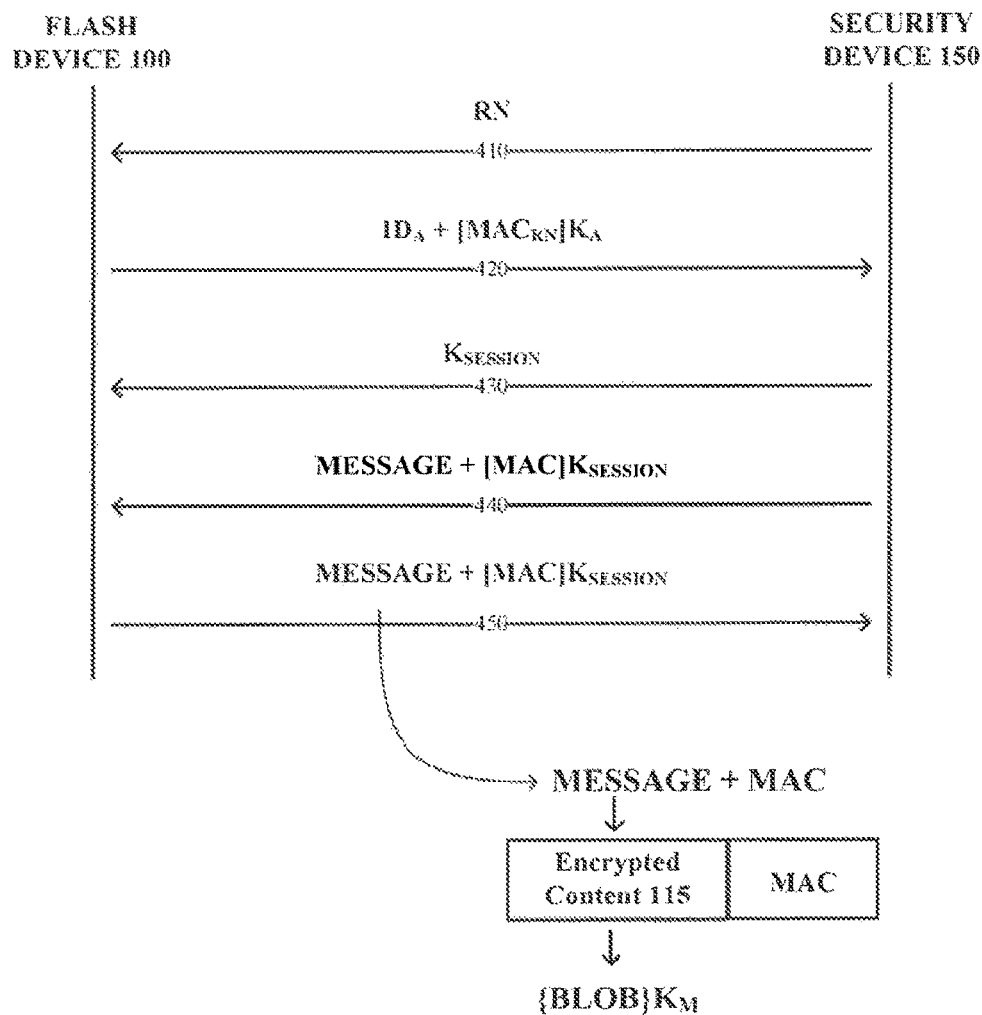
FIG. 4 illustrates an example authentication and message exchange session between an anti-replay protected flash device and a security device.

Turning now to FIG. 4, an example authentication and message exchange session between an anti-replay protected flash device and a security device is illustrated. FIG. 4 is described with continued reference to the example system 10 depicted in FIG. 1. However, the communication session of FIG. 4 is not limited to the embodiment of FIG. 1. In FIG. 4, the communications 410 and 420 illustrate example an authentication session for authenticating the flash device 100 to the security device 150 using a challenge-response mechanism. The communications 440 and 450 illustrate an example exchange of messages between the flash device 100 and the security device 150 after the flash device 100 has been authenticated.

The authentication session of FIG. 4 begins when the flash device 100 is coupled to the security device 150, causing the security device 150 to generate a random number (RN). The RN may be generated by the cryptography unit 175, and may be stored in the secure memory 170. The security device 150 sends a copy of the RN (via the connectivity unit 180) to the flash device 100 in the clear in the communication 410. The flash device 100 receives the RN via the connectivity unit 130, and the authentication unit 125 runs the RN through a MAC algorithm using the unique device key $K_A$ 122 to generate $[MAC_{RN}]K_A(1)$. The flash device 100 retrieves its unique device identifier $ID_A$ 121 from the secure memory 120, and sends (via the connectivity unit 130) the unique device identifier $ID_A$ 121 and the $[MAC_{RN}]K_A(1)$ to the security device 150 in the clear in the communication 420.

Upon receiving the communication 420, the security device 150 uses the unique device identifier $ID_A$ 121 received in the communication 420 to retrieve its copy of the unique device key $K_A$ 122 stored in the secure memory 170. For example, the security device 150 may search a key table 173 indexed by unique device identifiers to retrieve the unique device key $K_A$ 122. Thereafter, the cryptography unit 175 runs the RN stored in the secure memory 170 through the same MAC algorithm used by the flash device 100 to generate $[MAC_{RN}]K_A(1)$ using its copy of the unique device key $K_A$ 122 retrieved from the secure memory 170 to generate $[MAC_{RN}]K_A(2)$. The security device 150 then compares $[MAC_{RN}]K_A(1)$ to $[MAC_{RN}]K_A(2)$—a match indicating that the flash device 100 and the security device 150 share the same secret, i.e., the unique device key $K_A$ 122, and the flash device 100 provides anti-replay protection. If the comparison fails, the flash device 100 fails authentication.

After the flash device 100 is authenticated in the example of FIG. 4, the security device 150 generates a session key, such as the session key $K_{SESSION}$ 171, using the key generator 160, and sends the session key $K_{SESSION}$ 171 to the flash device 100 in the clear. Thereafter, and for as long as the session key $K_{SESSION}$ 171 is valid, the flash device 100 and the security device 150 may exchange communications, where each communication includes a message and a $[MAC]K_{SESSION}$ generated using the session key and a MAC algorithm (which may be the same or a different MAC algorithm used to authenticate the flash device 100). The recipient of a communication (e.g., message+ $[MAC]K_{SESSION}$) can run the message through the same MAC algorithm using its copy of the session key to verify the authenticity of the message and its sender.

In the example illustrated in FIG. 4, the security device 150 generates a command to read data from the flash array 110 (e.g., the message), and generates a $[MAC]K_{SESSION}$ 171 of the command using the session key $K_{SESSION}$ 171 and a MAC algorithm. The command and the $[MAC]K_{SESSION}$ are sent to the flash device 100 in the communication 440. Upon receipt, the flash device 100 can authenticate the command by running the command through the same MAC algorithm as the security device 150 using its copy of the session key $K_{SESSION}$ 171. Once the command is authenticated, the flash device 100 retrieves the data requested by the security device 150 from the flash array 110, and generates a $[MAC]K_{SESSION}$ using the retrieved data and its copy of the session key $K_{SESSION}$ 171. In communication 450, the flash device 100 sends the data retrieved from the flash array 110 and the $[MAC]K_{SESSION}$ to the security device 150, which may be authenticated using the techniques just described. In the communication 450, the data retrieved from the flash array 110 is the encrypted content 115—which may be a binary large object (BLOB) encrypted using the master key $K_M$ 172 of the security device 150.

In the example authentication and message exchange session of FIG. 4, even if the session key is intercepted by a malicious party in the communication 430, the security device 150 is protected against replay attacks by virtue of the session key. The session key may expire or become invalid—e.g., by the occurrence of an expiration event as described above. Once the session key expires, any attempt to replay a communication sent from the flash device 100 to the security device 150—such as the communication 450—will fail authentication at the security device 150.

The example communication of FIG. 4 illustrates an embodiment of the flash device 100 where the authentication unit 125 need only implement a single MAC algorithm to provide anti-replay protection, thus minimizing the amount of security logic disposed in the flash device 100. In FIG. 4, the unique device key $K_A$ 122 is a private cryptographic key.

Figure 5:
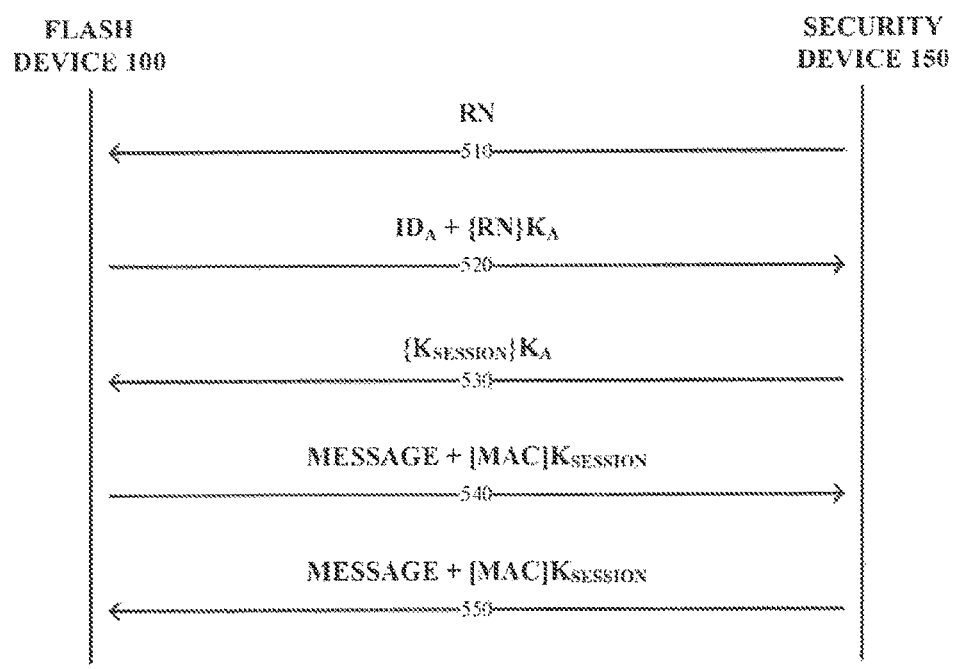
FIG. 5 illustrates an example authentication and message exchange session between an anti-replay protected flash device and a security device.

Other techniques for authenticating the flash device 100 are also within the scope of this disclosure. Using techniques other than that illustrated in FIG. 4, the authentication unit may need to implement more complex cryptography algorithms, and thus may be a more robust component. FIG. 5 illustrates another example authentication and message exchange session between an anti-replay protected flash device and a security device. FIG. 5 is described with continued reference to the example system 10 depicted in FIG. 1. However, the communication session of FIG. 5 is not limited to the embodiment of FIG. 1.

In FIG. 5, the communications 510 and 520 illustrate an example authentication session for authenticating the flash device 100 to the security device 150 using a challenge-response mechanism. The communications 540 and 550 illustrate an example exchange of messages between the flash device 100 and the security device 150 after the flash device 100 has been authenticated.

The authentication session of FIG. 5 begins when the flash device 100 is coupled to the security device 150, causing the security device 150 to generate a random number (RN). The RN may be generated by the cryptography unit 175, and may be stored in the secure memory 170. The security device 150 sends a copy of the RN (via the connectivity unit 180) to flash device 100 in the clear in the communication 510.

The flash device 100 receives the RN via the connectivity unit 130, and the authentication unit 125 of flash device 100 encrypts the RN using the unique device key $K_A$ 122. The flash device 100 retrieves its unique device identifier $ID_A$ 121 from the secure memory 120, and sends (via the connectivity unit 130) the unique device identifier $ID_A$ 121—in the clear—and the encrypted RN (e.g., $ID_A$+ $\{RN\}K_A$) to the security device 150 in the communication 520.

Upon receiving the communication 520, the security device 150 uses the unique device identifier $ID_A$ 121 received in the communication 520 to retrieve its copy of the unique device key $K_A$ 122 stored in the secure memory 170. For example, the security device 150 may search a key table 173 indexed by unique device identifiers to retrieve unique device key $K_A$ 122. Thereafter, the cryptography unit 175 decrypts $\{RN\}K_A$ to retrieve the RN, and the security device 150 compares the decrypted RN with the copy of the RN stored in the secure memory 170. Successfully decrypting and matching the RN from the flash device 100 to the copy of the RN stored in the security device 150 indicates that the flash device 100 provides anti-replay protection. In FIG. 5, the unique device key $K_A$ 122 may be a private key shared between the flash device 100 and the security device 150, or may be a public/private key pair—the private key being maintained at the flash device 100 and the public key being maintained by the security device 150.

Depending on the amount of security logic implemented in the authentication unit 125, additional cryptographic techniques may be applied to the RN to strengthen the authentication procedure. For example, the authentication unit may run the RN though a hash algorithm and send, in the communication 520, the unique device identifier $ID_A$ 121 and a hash of the RN encrypted by the unique device key $K_A$ 122. In this example, the security device 150 decrypts the hash received from the flash device 100, runs its copy of the RN though the same hash algorithm to generate a second hash, and compares the first and second hashes to authenticate the flash device 100. As should be apparent to a person skilled in the art, other techniques for authenticating the flash device 100 are within the scope of this disclosure.

After the flash device 100 is authenticated in the example of FIG. 5, the security device 150 generates a session key, such as the session key $K_{SESSION}$ 171, using the key generator 160, and sends the session key $K_{SESSION}$ 171 to the flash device 100 in the communication 530. The session key $K_{SESSION}$ 171 may be sent in the clear, or may be encrypted using the unique device key $K_A$ 122 to enhance the security of the communication 530. Upon receiving the communication 530, the flash device 100 may decrypt the session key $K_{SESSION}$ 171 using its copy of the unique device key $K_A$ 122 (if necessary). The communications 540 and 550 of FIG. 5 are as described in accordance with the communications 440 and 450 of FIG. 4.

Figure 6:
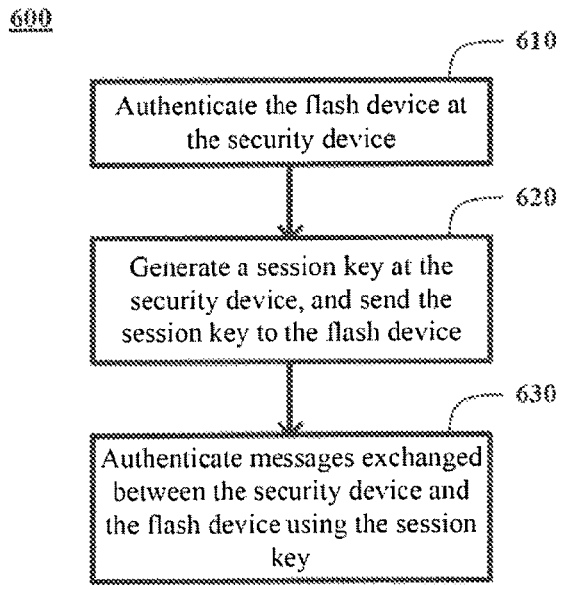
FIG. 6 illustrates an example method for providing anti-replay protection using an anti-replay protected flash device and a security device.

Referring to FIG. 6, an example method 600 for providing anti-replay protection using an anti-replay protected flash device and a security device is illustrated. In stage 610, an anti-replay protected flash device is authenticated by a security device. By authenticating the flash device, the security device verifies that the flash device is configured to provide anti-replay protection. Examples of authenticating an anti-replay protected flash device include, but are not limited to, the communications 410 and 420 of FIG. 4, and the communications 510 and 520 of FIG. 5.

In stage 620, the security device generates a session key and sends the session key to the anti-replay protected flash device. Examples of generating a session key and sending a session key to an authenticated anti-replay protected flash device include, by are not limited to, the communication 430 of FIG. 4, and the communication 530 of FIG. 5.

Figure 7:
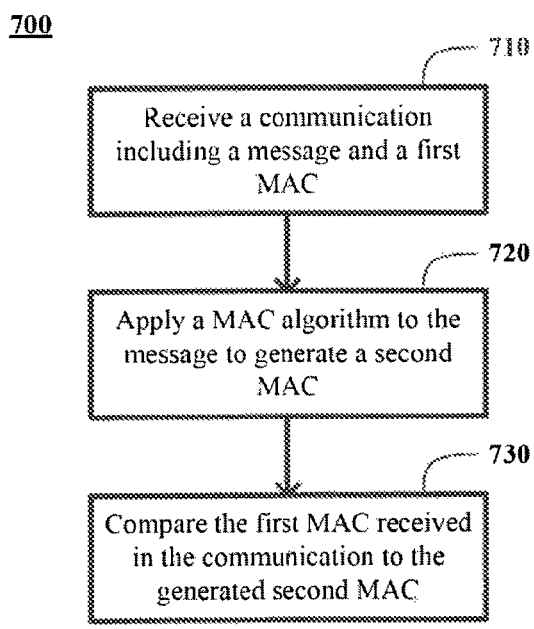
FIG. 7 illustrates an example method for authenticating one or more messages exchanged between an authenticated anti-replay protected flash device and a security device.

In stage 630, messages exchanged between the security device and the anti-replay protected flash device are authenticated using the session key the details of which are described in more detail in FIG. 7, FIG. 7 illustrates an example method 700 for authenticating one or more messages exchanged between an authenticated anti-replay protected flash device and a security device.

In stage 710, a communication is received by either an anti-replay protected flash device or a security device. The communication may be received at a connectivity unit. Here, the communication includes a message and a message authentication code (MAC). The message may be, but is not limited to, commands issued by the security device to the flash device, and data (which may be encrypted) retrieved from the flash array of the flash device. The MAC in the communication is generated by applying a MAC algorithm to the message using a session key.

In stage 720, the recipient of the communication parses the communication to identify the message and the MAC. Then, the message is applied to the same MAC algorithm described in stage 710 using a copy of the session key to generate a second MAC. In stage 730, the MAC received in the communication is compared to the MAC generated in stage 720—a match authenticating the message received in the communication. The communications 440 and 450 of FIG. 4, and the communications 540 and 550 of FIG. 5 illustrate additional examples of authenticating messages between a security device and an anti-replay protected flash device using a session key.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of other related applications. The Applicant therefore rescinds any disclaimer of claim scope made in any predecessor application in relation to the instant application. The Examiner is therefore advised that any such previous disclaimer and the cited references that it was made to avoid, may need to be revisited. Further, the Examiner is also reminded that any disclaimer made in the instant application should not be read into another application.

What is claimed is:

1. A system comprising:
   a security device; and
   an anti-replay protected flash device comprising:
   a flash memory array storing data encrypted by the security device;
   an authentication unit configured to authenticate the anti-replay protected flash device to the security device;
   a secure memory storing a unique device identifier, a unique device key, and a session key generated by the security device, wherein the authentication unit and the secure memory are disposed in a security boundary of the anti-replay protected flash device that is formed using a tamper evident or tamper resistant physical structure and
   a connectivity unit configured to couple the anti-replay protected flash device to the security device,
   wherein the anti-replay protected flash device is configured to maintain the unique device key within the security boundary, and to transmit the unique device identifier to the security device in response to receiving a random number from the security device.

2. The system of claim 1, wherein the authentication unit is the only component of the anti-replay protected flash device that can access the secure memory.

3. The system of claim 1, wherein:
   the unique device key is stored in the secure memory during manufacture or initial configuration of the anti-replay protected flash device.

4. The system of claim 1, wherein:
   the authentication unit is configured to authenticate the anti-replay protected flash device to the security device using the unique device key.

5. The system of claim 1, wherein:
   the authentication unit is configured to authenticate messages sent to and received from the security device using the session key.

6. The system of claim 1, wherein the security device comprises:
   a second secure memory storing the session key;
   a cryptography unit configured to authenticate the anti-replay protected flash device, and encrypt the data stored in the flash memory array of the anti-replay protected flash device; and
   a second connectivity device configured to couple the security device to the anti-replay protected flash device, and send the data encrypted by the security device and the session key to the anti-replay protected flash device.

7. The system of claim 6, wherein:
   the security device further comprises a key generator configured to generate the session key.

8. The system of claim 6, wherein:
   the second secure memory stores the unique device key, and
   the cryptography unit is configured to authenticate the anti-replay protected flash device using the unique device key.

9. The system of claim 6, wherein:
   the cryptography unit is configured to encrypt the data stored in the flash memory array using a master key stored in the second secure memory.

10. The system of claim 6, wherein:
    the cryptography unit is configured to decrypt data retrieved from the flash memory array using a master key stored in the second secure memory after authenticating the anti-replay protected flash device.

11. The system of claim 6, wherein:
    the authentication unit is configured to authenticate messages sent to and received from the security device using a message authentication code algorithm and the session key, and
    the cryptography unit is configured to authenticate messages sent to and received from the anti-replay protected flash device using the message authentication code algorithm and the session key.

12. The system of claim 6, wherein:
    the first and second connectivity devices are configured to couple the anti-replay protected flash device and the security device via a wired or wireless connection.

13. An anti-replay protected flash device comprising:
    a flash memory array storing data encrypted by a security device;
    an authentication unit configured to authenticate the anti-replay protected flash device to the security device;
    a secure memory storing a unique device identifier, a unique device key, and a session key generated by the security device, wherein the authentication unit and the secure memory are disposed in a security boundary of the anti-replay protected flash device that is formed using a tamper evident or tamper resistant physical structure and a connectivity device configured to couple the anti-replay protected flash device to the security device, wherein the anti-replay protected flash device is configured to maintain the unique device key within the security boundary, and to transmit the unique device identifier to the security device in response to receiving a random number from the security device.

14. The anti-replay protected flash device of claim 13, wherein the authentication unit is the only component of the anti-replay protected flash device that can access the secure memory.

15. The anti-replay protected flash device of claim 13, wherein: the unique device key is stored in the secure memory during manufacture or initial configuration of the anti-replay protected flash device.

16. The anti-replay protected flash device of claim 13, wherein:
the authentication unit is configured to authenticate the anti-replay protected flash device to the security device using the unique device key.

17. The anti-replay protected flash device of claim 13, wherein:
the authentication unit is configured to authenticate messages sent to and received from the security device using the session key.

18. A method for anti-replay protection comprising:
sending, by a security device, a random number to an anti-replay protected flash device;
receiving, by the security device, a unique identifier of the anti-replay protected flash device in response to sending the random number;
authenticating, by the security device, the anti-replay protected flash device using a unique device key of the anti-replay protected flash device and the unique identifier;
maintaining, by the security device, the unique device key and the unique identifier within a security boundary formed using a tamper evident or tamper resistant physical structure;
generating, by the security device, a session key in response to authenticating the anti-replay protected flash device;
sending, by the security device, the session key to the anti-replay protected flash device; and
authenticating, by the security device, messages exchanged between the security device and the anti-replay protected flash device using the session key.

19. The method of claim 18, further comprising:
setting an expiration event for the session key at the security device, wherein upon occurrence of the expiration event the session key becomes unable to authenticate messages exchanged between the security device and the anti-replay protected flash device.

20. The method of claim 18, wherein:
authenticating messages exchanged between the security device and the anti-replay protected flash device using the session key comprises generating a message authentication code using the session key for each message exchanged between the security device and the anti-replay protected flash device.

* * * * *